Patented Oct. 31, 1950

2,528,391

UNITED STATES PATENT OFFICE 2,528,391

METHODS OF IMPROVING THE DURABILITY OF GLASS CONTAINERS

Eric Seddon, London, England

No Drawing. Application April 27, 1948, Serial No. 23,627. In Great Britain January 25, 1943

3 Claims. (Cl. 41—42)

This application is a continuation in part of my application Serial No. 514,298, filed December 14, 1943, now abandoned, for "Methods of improving the durability of glass containers."

This invention relates to methods of improving the durability of glass containers, the term "durability" being here used to include inter alia ability to resist chemical attack by water or other liquids commonly contained in glass containers and ability to withstand exposure to atmospheric conditions which commonly cause some deterioration in the quality or appearance of glass surfaces.

It is known to treat the interior surfaces of glass containers by exposing them, whilst hot, to the action of acidic gas. For this purpose, it has been proposed to deposit in the glassware while the latter is hot, a sulphur pellet which when subjected to the heat of the glassware, fires and liberates an acidic gas. It has also been proposed to pass the bottles through a muffle or annealing lehr that is charged with an acid gas.

In accordance with the present invention, there is provided a method of improving the durability of glass bottles and like containers which comprises introducing into the container a mixture of ammonium salts containing both sulphur and oxygen, with halogen salts of the ammonium radicle NH4 such as ammonium chloride. In this way, a more complete removal of alkali at or immediately beneath the internal surface of the glassware is facilitated.

The ammonium salts containing both sulphur and oxygen may consist of ammonium sulphate, or ammonium bisulphate, or ammonium thiosulphate, or ammonium persulphate, either alone or combined as regards any of them with a retarding agent, such as, for example, ammonium carbonate or ammonium bicarbonate.

In carrying the invention into effect, the materials may be introduced into the containers in tabletted, briquetted or pelleted form or as crystals or powders. Alternatively, they may be introduced as a spray after dissolving in suitable solvents, or in vapour form after volatilising the medium at suitably chosen tempeartures in an external apparatus.

The materials used may be introduced into the hot glassware passing mechanically or by hand from the glass forming machines to the annealing lehr, or, alternatively, they may be introduced into cold glassware entering the oven or muffle lehr such as is used for re-heating, re-annealing or enamelling.

In the preferred mode of carrying out the invention, the necessary amount of the mixture in tabletted, briquetted, or pelleted form, is introduced into the hot bottle or container by automatic means as it passes on a conveyor or the like from the forming machine to the annealing lehr. It is to be understood, however, that the mixture, need not necessarily be in briquetted or pelleted form, but may, in some instances, be introduced into the bottle in the form of crystals or powder, or it may be dissolved or suspended in a volatile liquid, e. g. water, which is introduced into the bottle by means of a spraying nozzle, tap, or other well-known means, or it may be introduced by other than automatic means, as, for instance, manually, nor is it necessary to introduce the substance into the bottle while the latter is hot. It may, for instance, be convenient to introduce the substance into the bottle while it is cold and then to reheat the bottle in a more or less closed muffle to a temperature sufficient to decompose the mixture and sufficient to cause the resulting acid gases to react with the hot glass surface.

I have found that ammonium chloride is by no means so satisfactory as ammonium sulphate as it does not produce such high durability. Consequently the proportion of ammonium chloride in the mixture should be less than the sulphate. Some chloride is however desirable and in particular it serves as a binder to enable the mixture to be satisfactorily pelleted. I prefer therefore a mixture consisting of 90–97 per cent of ammonium sulphate, the remainder being ammonium chloride. A trace of a wax serving as a pelleting lubricant may also be included, e. g. 0.2 per cent or less than 0.5 per cent. The wax may be stearic acid.

I claim:

1. A method of improving the durability of glass containers which comprises introducing a pelleted mixture of ammonium sulphate with ammonium chloride into the container and effecting a decomposition therein of said mixture, the mixture containing 90 to 97 per cent of ammonium sulphate.

2. A method of improving the durability of glass containers which comprises introducing a pelleted mixture of ammonium sulphate with ammonium chloride into the container and effecting a decomposition therein of said mixture, the quantity of ammonium sulphate in the mixture being greater than the quantity of ammonium chloride.

3. A method of improving the durability of glass containers which comprises introducing a pelleted mixture of ammonium sulphate with ammonium chloride and a lubricant into the container and effecting a decomposition therein of said mixture, the mixture containing 90 to 97 per cent of ammonium sulphate and less than 0.5 per cent of a lubricant.

ERIC SEDDON.

REFERENCES CITED

The following references are of record in the file of this patent:

UNITED STATES PATENTS

| Number | Name | Date |
|---|---|---|
| 1,760,427 | Matlock | May 27, 1930 |
| 2,053,066 | Cunningham | Sept. 1, 1936 |
| 2,081,401 | Kniskern | May 25, 1937 |
| 2,175,076 | Burch | Oct. 3, 1939 |
| 2,184,320 | Simpson | Dec. 26, 1939 |
| 2,436,771 | Hood | Feb. 24, 1948 |